(12) United States Patent
Sullivan et al.

(10) Patent No.: US 6,781,054 B1
(45) Date of Patent: Aug. 24, 2004

(54) CONDUIT AND JUNCTION BOX GUIDE

(76) Inventors: Francis M. Sullivan, 113 Edgehill Rd., Norwood, MA (US) 02062; James M. Sullivan, 78 Woodland Rd., Norwood, MA (US) 02062

(*) Notice: Subject to any disclaimer, the term of this patent is extended or adjusted under 35 U.S.C. 154(b) by 0 days.

(21) Appl. No.: 10/656,463

(22) Filed: Sep. 5, 2003

(51) Int. Cl.[7] ................................................. H02G 3/04
(52) U.S. Cl. .......................... 174/48; 174/68.1; 174/49; 52/220.7; 439/207
(58) Field of Search ........................ 174/48, 49, 68.1, 174/68.3, 96, 97, 47, 21 R; 439/207, 114; 52/220.7, 220.5; 220/3.2

(56) References Cited

U.S. PATENT DOCUMENTS

| | | | |
|---|---|---|---|
| 2,321,415 A | 6/1943 | Peltz et al. | |
| 2,515,724 A | 7/1950 | McCroskey | |
| 2,746,716 A | 5/1956 | Zachary | |
| 2,838,280 A | 6/1958 | Eyles | |
| 3,005,620 A | 10/1961 | Trunnell | |
| 3,037,744 A | 6/1962 | Cooper | |
| 3,573,344 A | * 4/1971 | Snyder | 174/57 |
| 4,132,665 A | 1/1979 | Nelson | |
| 4,951,923 A | 8/1990 | Couture | |
| 5,180,074 A | * 1/1993 | Bowman et al. | 220/3.8 |
| 5,236,177 A | 8/1993 | Tamm | |
| 5,700,977 A | 12/1997 | Ford et al. | |
| 6,291,986 B1 | * 9/2001 | Sorensen | 324/156 |

* cited by examiner

Primary Examiner—Dhiru R Patel
(74) Attorney, Agent, or Firm—John P. McGonagle

(57) ABSTRACT

A removable tube within each junction box interconnecting conduit pipes thereby providing a travel-smooth path for fish tapes through a junction box. Each guide tube has a ring near each end providing an insertion limit into a conduit. Each tube has a perforated score line along its length for easy removal after wire installation.

7 Claims, 2 Drawing Sheets

CONDUIT AND JUNCTION BOX GUIDE

BACKGROUND OF THE INVENTION

This invention relates to conduit systems, and in particular, to guide for the installation of wiring through junction boxes.

The current practice for wiring an apartment house or other type building with a plurality of floors is to install a number of junction boxes with interconnecting conduits. In today's society, there are a number of wires, such as for telephones, communications, power, entertainment, and the like, being passed through the conduits and junction boxes. In order to place wires in the conduit/junction box system, a steel fish tape is passed through the conduit and the wires are pulled in and through by means of this tape. This work is accomplished by installing one or more wires at a time as additional individual stations are required. While the sections of conduit pipe connected to the junction box tops and bottoms and side to side are in alignment, it is difficult to pass the fish tape from one conduit section through the junction box and then cause it to enter the conduit pipe section directly opposite. If fishing straight through the junction box cannot be accomplished, which is the usual case, the workman must open one or more of the intermediate junction boxes to guide the fish tape through. Installation of wires in conduit systems has been found to involve time-consuming operations because of the many intermediate steps required.

Accordingly, it is an object of this invention to overcome the difficulties now encountered in the installation of wires through conduit/junction box systems.

SUMMARY OF THE INVENTION

The present invention overcomes the difficulties of installing wires through a conduit/junction box system by providing a removable tube within each junction box so that opposite conduit pipes are interconnected and the installation fish tape has a travel-smooth path without being obstructed by a junction box.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
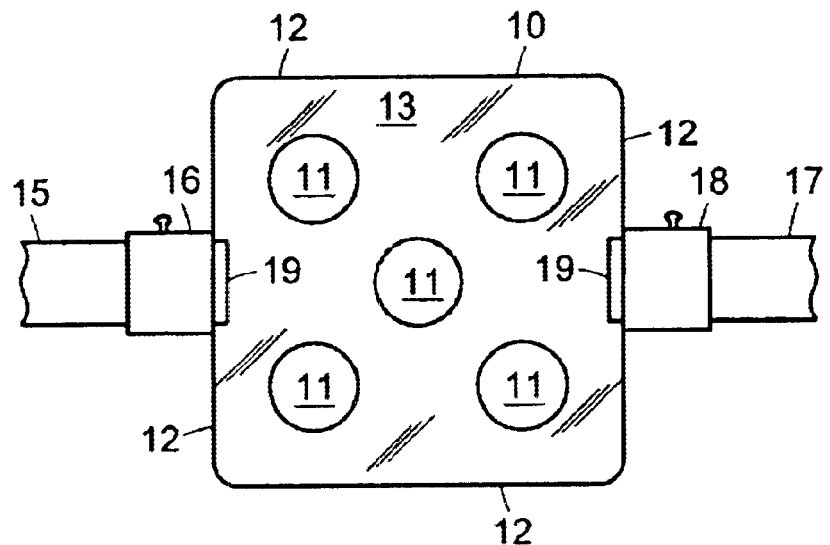
FIG. 1 is a front elevational view of a junction box with two interconnecting conduit pipes.

Referring to the drawings in detail wherein like elements are indicated by like numerals, a conventional electrical junction box is indicated at 10 and may have a plurality of knockout areas 11 which are typically removed for attachment of electrical conduit. Normally, there will be knockout openings along the four sides 12 and the back 13 of the junction box. As shown in FIG. 1, a hollow conduit 15 is attached by a connector 16 to one of the side openings in the junction box 10, and a second conduit 17 is attached by a connector 18 to one of the knockout openings in an opposite side of the junction box 10.

Figure 2:
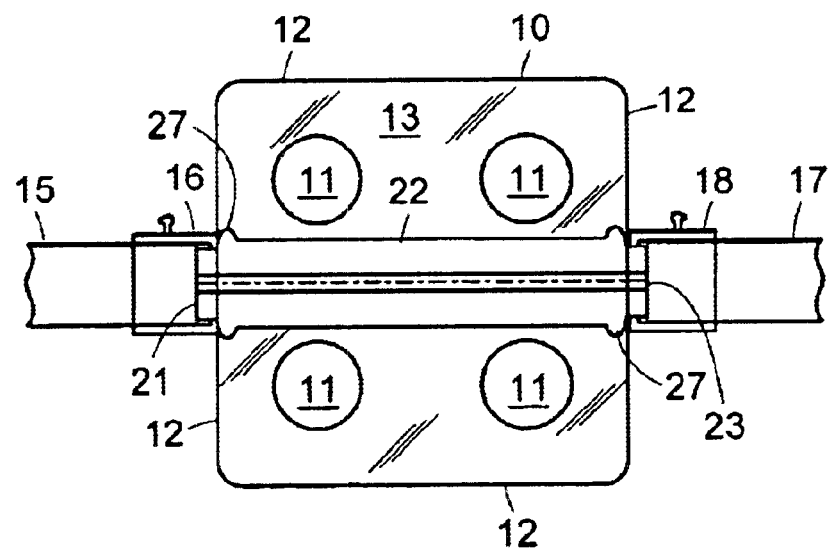
FIG. 2 is a view of FIG. 1 with an invention guide installed thereby interconnecting the two conduit pipes.
Figure 3:
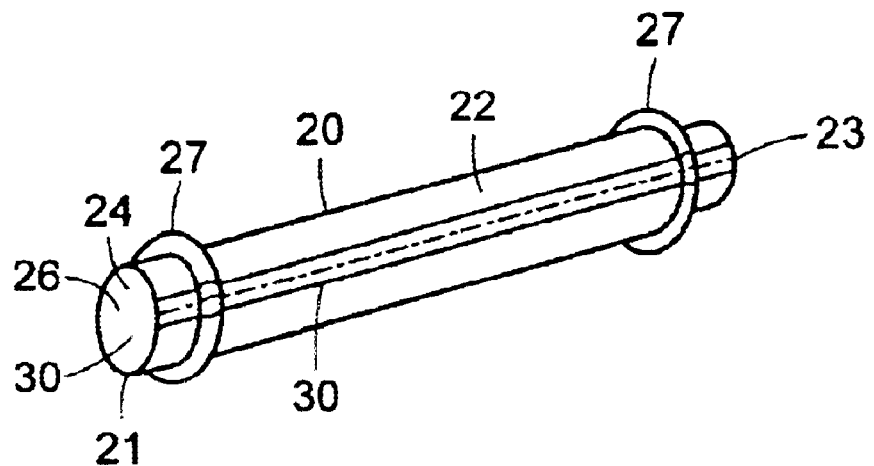
FIG. 3 is a perspective view of the invention guide.
Figure 4:
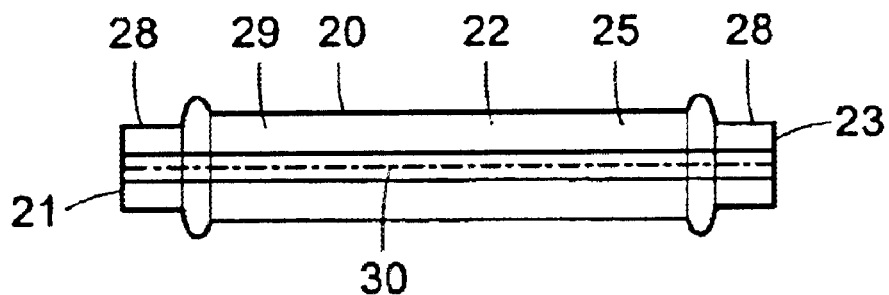
FIG. 4 is a side elevational view of the invention guide of FIGS. 2 and 3.

Referring particularly to FIGS. 2 through 4, the present invention guide 20 has a generally hollow, cylindrical shape, said guide 20 having an open first end 21 from which cylindrical side walls 22 extend to an open second end 23, said guide 20 having a longitudinal axis defined by said ends 21, 23, said side walls 22 and ends 21, 23 defining a hollow interior 24. The side walls 22 have an exterior surface 25 and an interior surface 26. The guide 20 is further comprised of two cylindrical rings 27 attached about the guide side wall exterior surface 25, each ring 27 being positioned near to a guide end 21, 23. The guide longitudinal end portion 28 between a ring 27 and an end 21, 23 may be radially tapered to a diameter less than the diameter of the longitudinal body portion 29 between the rings 27. The guide 20 may also have one or more scored, break-away lines 30 formed longitudinally along its length, said lines 30 also being formed through the rings 27. The present invention guide 20, including rings 27, is made from plastic or other non-conducting material, thereby making the present invention guide 20 usable for power lines as well as communications lines.

The National Electric Code (NEC) requires that raceways and fittings, i.e., conduit/junction box systems, be completed before installation of wires. In normal systems, because of the number of junction boxes in a run, the fish tape (snake) will eventually hang up in one of the junction boxes. The present invention guide 20 is installed in each junction box 10 in a run before wires are passed through. The present invention guide may be rigid or flexible thereby providing any desired path through a junction box. The invention guide 20 is positioned within a junction box 10 and an end portion 28 is inserted into a conduit opening 19. The guide opposite end portion 28 is then inserted into another desired conduit opening 19 completing a wire path through the junction box 10. The guide rings 27 have diameters exceeding the diameters of the conduits and thereby limit the extent of insertion into a conduit opening 19. The guide 20 prevents the fish tape from hanging up inside a junction box. When the wires are pulled through the raceway and the wire pulling operation is completed, the guides 20 inside the junction boxes 10 may be removed by simply breaking the guides 20 along their score lines 30 and removing the guides 20.

It is understood that the above-described embodiment is merely illustrative of the application. Other embodiments may be readily devised by those skilled in the art which will embody the principles of the invention and fall within the spirit and scope thereof.

We claim:

1. A removable electrical conduit junction box wire installation guide for directing wire through a junction box interior, said junction box having knockout openings interconnected to a plurality of hollow conduits external to said junction box, comprising:

a hollow tube removably positioned within said junction box interior, said tube having an open first end from which cylindrical side walls extend to an open second end, said tube having a longitudinal axis defined by said ends, said side walls and ends defining a hollow interior, said side walls having an exterior surface and an interior surface, said tube first end being inserted through a junction box knockout opening into an attached conduit opening, said tube second end being inserted into another junction box knockout opening into another attached conduit opening.

2. A guide as recited in claim 1, further comprising:

two cylindrical rings attached about the tube side wall exterior surface,each ring being positioned within said junction box interior near to a tube end, said tube having a portion between a ring and an end, said rings having diameters exceeding a diameter of the attached conduit opening, said rings adapted to prevent said guide from exiting the junction box interior through a function box knockout opening while guiding wire through said function box.

3. A guide as recited in claim 2, wherein:

said attached rings are formed in said tube side wall exterior surface.

4. A guide as recited in claim 3, wherein:

said tube has a plurality of scored, break-away lines formed longitudinally along a tube length, said lines being formed through the rings, said tube adapted to being broken alone said lines and removed from said junction box interior.

5. A guide as recited in claim 4, wherein:

the guide is made from a nonconductive material.

6. A guide as recited in claim 5, wherein:

said portions between a ring and an end are radially tapered to a diameter less than a diameter of a longitudinal body portion between the rings.

7. A guide as recited in claim 6, wherein:

said portions between a ring and an end are radially tapered to a diameter less than the diameter of a the attached conduit opening.

\* \* \* \* \*